Figure 1:
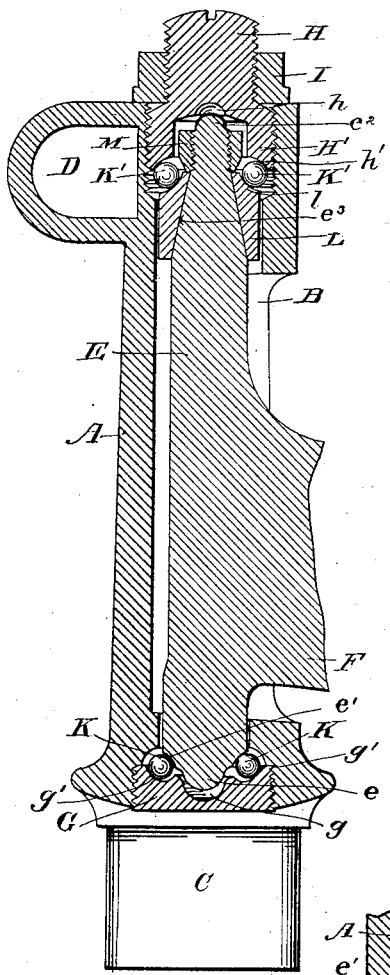

(No Model.)

J. KNOUS.
STEERING HEAD FOR VELOCIPEDES.

No. 371,266. Patented Oct. 11, 1887.

WITNESSES.
Everett S. Benson,
Chas. E. Walker

INVENTOR.
John Knous
By Charles E. Pratt
Atty

UNITED STATES PATENT OFFICE.

JOHN KNOUS, OF HARTFORD, CONNECTICUT, ASSIGNOR TO THE POPE MANUFACTURING COMPANY, OF PORTLAND, MAINE.

STEERING-HEAD FOR VELOCIPEDES.

SPECIFICATION forming part of Letters Patent No. 371,265, dated October 11, 1887.

Application filed July 15, 1887. Serial No. 244,362. (No model.)

*To all whom it may concern:*

Be it known that I, JOHN KNOUS, of the city and county of Hartford, in the State of Connecticut, have invented certain new and useful Improvements in Steering-Heads for Velocipedes, of which the following is a specification.

My improvements relate more particularly to that class of steering-heads known as "cylindrical" or "center" steering-heads, in which there is a vertical or inclined spindle attached by a neck to the perch or reach of the frame, which spindle is inserted in a cavity in a cylindrical head connected with the steering-fork and is stepped in the bottom of the head and is held by its upper center by a seat in an adjusting-bolt. Heretofore it has been customary to make the step having a seat for the lower center or end of the spindle either integral with the steering-head or in an inserted block, and to form the centers or upper and lower ends of the spindle either in conical form or in hemispherical form, with the seats to correspond, the upper seat being in the lower end of a threaded bolt, adjustable to give a suitable bearing, and the adjusting-bolt has been held by a set-nut working on the end of it outside of the steering-head. This bolt has sometimes been made hollow in its upper end, so as to take a longer or shorter bearing upon and inclosure of the upper end of the spindle; and it has also been proposed heretofore to insert a row of balls in the lower end of the adjusting-bolt and another row of balls in the step, and to secure these balls respectively in place by caps fitting upon the ends of the spindle. It has also been proposed to make a ball-bearing-socket steering-head in which the spindle has been attached to the steering-fork and the outside cylinder to the frame by the interposition of rows of balls at the top and bottom; and in carrying out my improvements my object is, first, to make a simple, effective, and practicable form of adjustable anti-friction ball-bearing for either the upper or lower steering-center, or both, in which the balls may run on unbroken hardened surfaces; and, secondly, to construct the parts at the same time, so that when the balls are removed, by reason of breakage of one or more, or other accident or disarrangement to the balls, the head may operate practically and efficiently with plain centers by simply removing the balls and adjusting the bolt and follower to the upper center, thus producing an interchangeable plain and ball steering-head, equally effective without the balls with any plain steering-head now in use, and with the balls more effective and simple in construction than any heretofore used.

The nature of my improvements, which consist in certain modifications and combinations of devices, will be better understood from the following description, taken in connection with the drawings, in which—

Figure 2:
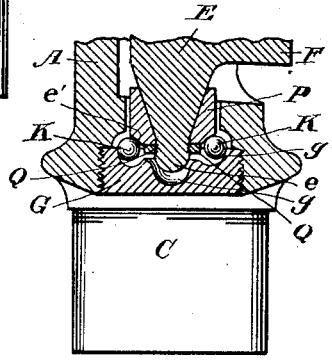
Figure 3:
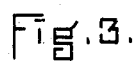

Figure 1 shows in vertical section a bicycle steering-head with my improvements applied in one form to constitute an adjustable ball-bearing steering-head, and Fig. 2 shows the same adjusted for a plain-bearing steering-head without the balls, and Fig. 3 shows parts of the same as Fig. 1, including a separate bearing-collar on the lower steering-center, as will be more fully explained.

A is a cylindrical steering-head, having a cavity, B, for the spindle and neck.

C is a stud for the attachment of one arm of the steering-fork.

D is a lug for attachment to the handle-bar.

E is a spindle attached by the neck F to the perch of a bicycle or the reach of a tricycle-frame.

G is a step inserted in the frame of the steering-head, which I prefer to construct of hardened steel and threaded in the bottom of the head, where it may be held by a spline or screw or any suitable fastening after it is in position, and which I construct with a central seat or hollow, as $g$, either in hemispherical form or in conical form, and with an annular groove or inclined bearing-path, $g'$, for a row of balls.

H is an adjusting-bolt, having a threaded upper portion for a set-nut, I, on the outside of the steering-head, and having a lower portion, H', constructed as a follower, hollow and enlarged by preference, with a hemispherical or conical seat, $h$, and with an annular groove or inclined path, $h'$, for a row of balls.

K K are circular rows of balls.

L is a bearing-collar, which I prefer to construct in the form of a ring, with a conical seat on the upper end of the spindle E, and which has an annular groove or inclined path, $l$, for the row of balls K.

M is a small set-nut threaded upon the end of the spindle to hold the collar L in place. A collar, P, similar to the collar L, may also be used on the lower end of the spindle, as shown in Fig. 3, and may be held in place by a small set-nut, Q, or otherwise. The object of these collars is to permit of a true polish and finely-hardened surface for the balls to travel upon without the danger of rendering the spindle brittle by the hardness, as would be the case where the collars are not used, or, on the other hand, to avoid the softness of metal if the spindle be not hardened.

The spindle E has the bearing-centers $e\ e^2$, and in case the ring P be not used, the annular groove or inclined bearing surface $e'$ for the row of balls K. The parts are so constructed and proportioned that the centers $e\ e^2$ shall fit the seats $g\ h$, and that the bolt H and follower H' may be screwed into the head not only far enough to adjust the ball-bearing, but also, when the balls are removed, be screwed in farther to adjust the centers referred to. An allowance of a sixteenth of an inch is practically sufficient, when the ball-bearing is adjusted, as a space between the parts $e'$ and $g$, and between the parts $e^2$ and $h$, which would require an allowance in the threaded upper portion of the steering-head A for a play of one-eighth of an inch, or a trifle more for wear in the follower H'.

The manner of assembling and operation of this contrivance will now be fully understood by any one skilled in the art of velocipede construction, and while I do not claim, broadly, either a ball-bearing steering-head or a plain-bearing steering-head, I do not mean to be limited strictly to the form, proportion, or arrangement of devices shown and described, since modifications in this may be obviously made without departing from the substance of my invention.

I claim as new and of my invention—

1. A combination adjustable plain and ball center steering-head, constructed essentially as set forth.

2. In a velocipede steering-head, the combination, with the lower end of a spindle, as E, of a plain center and seat, as $e\ g$, and a ball center and seat, as $e'\ g'$, constructed to operate either with or without a row of balls, as K, essentially as set forth.

3. In a velocipede steering-head, the combination, with the upper end of a spindle, as E, of a plain center and seat, as $e^2\ h$, and a ball center and seat, as $h'\ l$, constructed to operate either with or without a row of balls, as K', essentially as set forth.

4. The combination, in a velocipede steering-head having a ball-bearing center, of a removable hardened bearing-collar, as L, having a collar both for a row of balls and a seat on the spindle, and a device, as M, for securing it in position on the spindle.

5. The combination of steering-head A, cavity B, spindle E, step G, bearing-collar L, set-nut N, adjusting bolt and follower H H', and set-nut I and balls K', constructed to operate essentially as set forth.

6. The combination, in a velocipede steering head, of a spindle, as E, with hardened collars, as L P, a bearing-path, as $e'\ l$, and sockets, as $e\ e^2$, a hardened step, as G, with seat, as $g$, a bearing-path, as $g'$, an adjusting-bolt, as H, with set-nut, as I, and a hardened follower, as H', having a seat, as $h$, and a bearing-path, as $h'$, essentially as set forth, to operate as a ball-bearing head, with a lower row of balls, as K, or an upper row of balls, as K', or with both rows of balls, or as a plain bearing-head without the balls.

JNO. KNOUS.

Witnesses:
E. S. HOUSE,
GEO. H. DAY.